(No Model.)

G. RUMPF.
MANUFACTURE OF ACETONE.

No. 393,079. Patented Nov. 20, 1888.

Witnesses
R. B. Seward.
O. L. Stewart.

Inventor:
G. Rumpf
By his atty
E. G. Seward
Associate

N. PETERS. Photo-Lithographer, Washington, D. C.

UNITED STATES PATENT OFFICE.

GUSTAV RUMPF, OF FRANKFORT-ON-THE-MAIN, GERMANY, ASSIGNOR TO ROESSLER & HASSLACHER, OF NEW YORK, N. Y.

MANUFACTURE OF ACETONE.

SPECIFICATION forming part of Letters Patent No. 393,079, dated November 20, 1888.

Application filed July 12, 1888. Serial No. 279,763. (No model.)

*To all whom it may concern:*

Be it known that I, GUSTAV RUMPF, of Frankfort-on-the-Main, Germany, have invented a certain new and useful Improvement in the Manufacture of Acetone from an Acetate, of which the following is a specification.

The object of this improvement is to facilitate the manufacture of acetone from an acetate, especially acetate of lime.

Acetone has long been obtained from the destructive distillation of an acetate. This distillation has been commonly pursued at a temperature of at least three hundred degrees centigrade, (300° centigrade,) the acetone, as it is evolved in this destructive distillation, being collected in a receiver. Previous to the destructive distillation of the acetate this material has in some cases been subjected to a heating or roasting process for the purpose of freeing it from certain impurities. Great difficulty has attended the purification of an acetate by such a heating or roasting treatment, for the reason that it was difficult to regulate the degree of heat to insure the attainment of the desired result and yet to avoid the liability of serious injury to the acetate.

My improvement consists in certain features in the treating or roasting of an acetate, whereby I am enabled to accomplish the desired result without incurring any danger of seriously injuring the acetate.

My improvement also involves the destructive distillation of the acetate after its purification by my heating or roasting process and the ultimate purification of the crude acetone obtained from the destructive distillation of the purified acetate.

I will describe my process in detail with the aid of drawings, illustrating an apparatus by the use of which my first process may be conveniently carried on.

Figure 1:
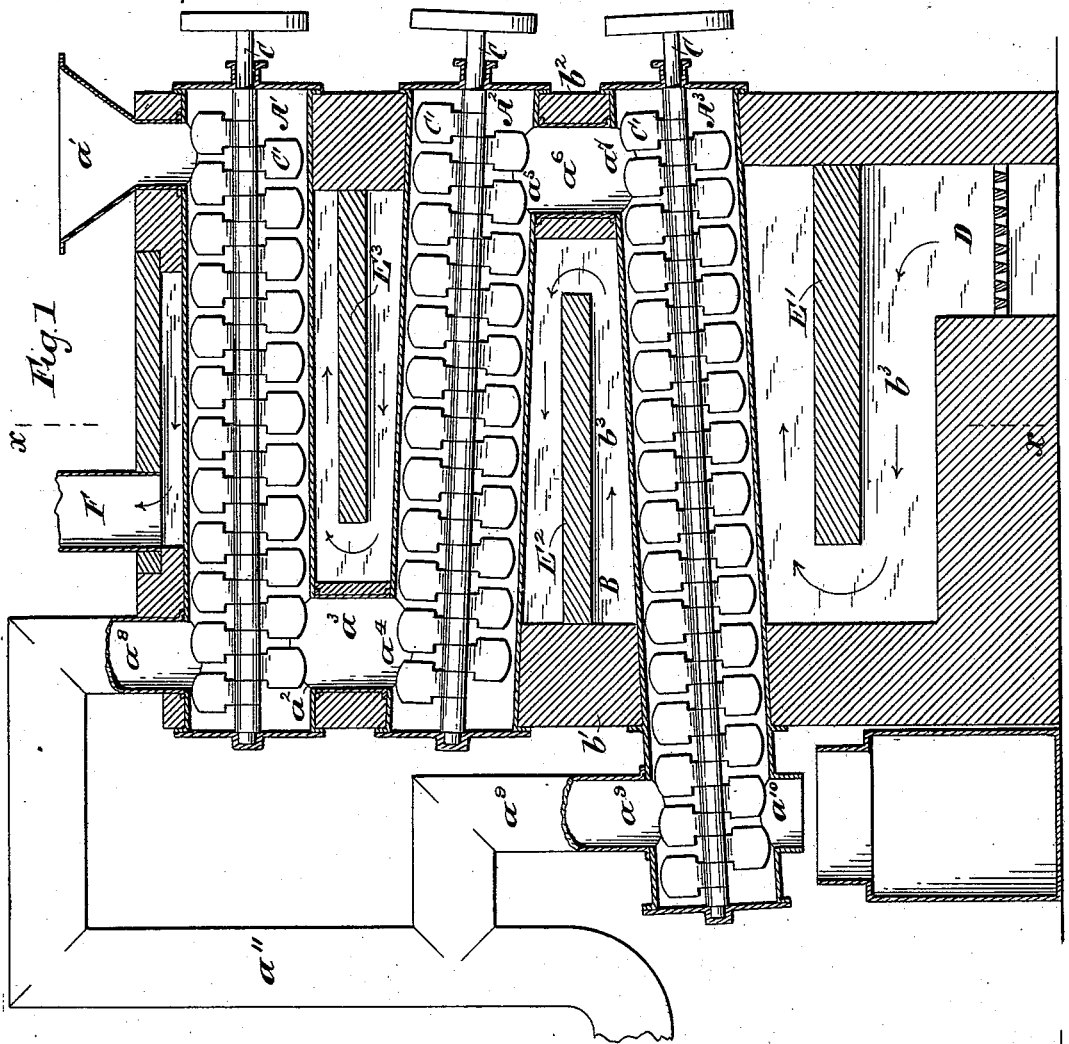
Figure 2:
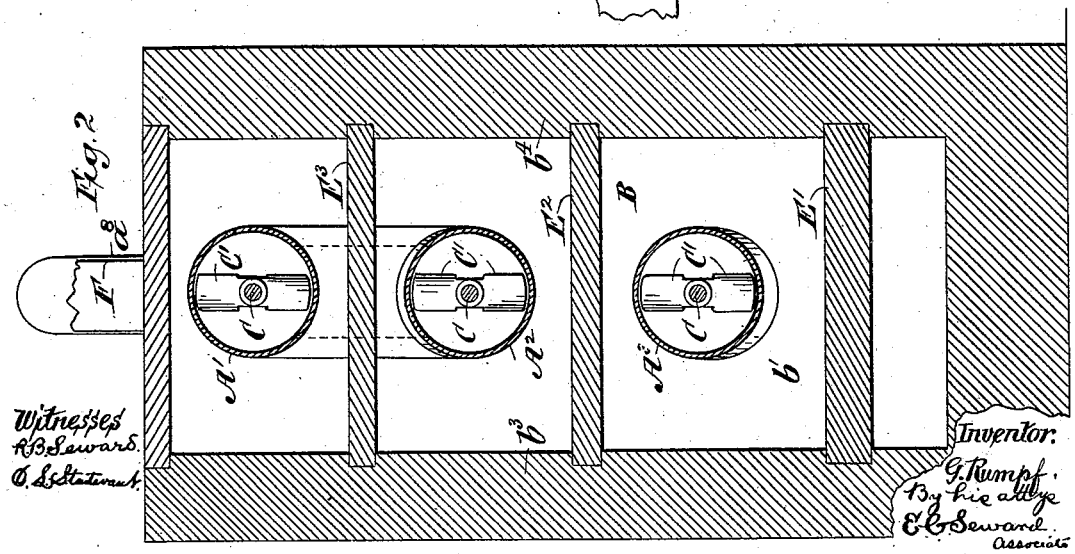

In the accompanying drawings, Figure 1 is a vertical longitudinal section of an apparatus constructed for use in carrying out my purification of a crude acetate by heating or roasting. Fig. 2 is a transverse vertical section taken at the plane of the dotted line $xx$, Fig. 1.

Similar letters of reference designate corresponding parts in both figures.

In order that I may clearly explain the details of my improvement, I will begin with a description of the apparatus illustrated in the drawings.

$A'$ $A^2$ $A^3$ designate tubes, of which there may be any suitable number. I have shown but three. They are, as here represented, arranged one above another, and are supported in masonry, shown as consisting of four walls, $b'$ $b^2$ $b^3$ $b^4$. The tubes $A'$ $A^2$ $A^3$ are supported at the ends by extending into the walls $b'$ $b^2$. The space between the four walls constitutes a chamber, B, through which the tubes extend. I have shown the tube $A'$ as arranged horizontally. At one end it is provided with a hopper, $a'$, through which acetate to be heated or roasted for the purposes of purification may be introduced. Near the other end it has an opening, $a^2$, in its lower portion, and opposite this opening $a^2$ piping $a^3$ is extended downwardly to a corresponding opening in the opposite upper portion of the tube $A^2$. The piping $a^3$ may consist of cylindric extensions from the two tubes $A'$ $A^2$. It will be evident that acetate placed in the tube $A'$ may therefore pass from this tube into the tube $A^2$. The tube $A^2$ is shown as inclined downwardly from that end which communicates with the tube $A'$. Near the end which is the farther from the piping $a^3$ the tube $A^2$ is provided with an opening, $a^5$. Piping $a^6$, which may be like the piping $a^3$ heretofore described, extends between the opening $a^5$ of the tube $A^2$ to an opening, $a^7$, in the opposite upper portion of the tube $A^3$. The tube $A^3$, I have shown as inclined downwardly from that end which is provided with the opening $a^7$.

Each of the tubes $A'$ $A^2$ $A^3$ is provided with stirring apparatus consisting of a shaft, C, and blades $C'$, affixed thereto. These blades are preferably made oblique, so that they may also serve as propellers to feed the acetate through the tubes.

The acetate is to be fed through the tubes very slowly, so it will be necessary to avoid giving the blades too great obliquity.

The tube $A'$ at that end which is the farther from the hopper $a'$ communicates at the upper portion with a pipe, $a^8$. Any vapors evolved from the acetate in the tube $A'$ may pass off through the pipe $a^8$. It will be observed that the pipe $a^8$ is arranged opposite the opening $a^2$ of the tube $A'$. Owing to this, vapors evolved from the acetate in the tube $A^2$ may pass upward transversely through the tube $A'$ into the pipe $a^8$.

The tube $A^3$ at the lower end extends through and beyond the wall $b'$ of the chamber B. The upper part of its protruding portion is provided with an opening which communicates with a pipe, $a^9$. Opposite this opening, and in the lower part of the protruding portion, is a discharge opening or outlet, $a^{10}$. Vapors evolved from the acetate within the tube $A^3$ may pass out through the pipe $a^9$. The purified acetate is discharged through the opening $a^{10}$. The pipes $a^8$ $a^9$ are shown as connected with a descending pipe, $a^{11}$. This pipe $a^{11}$ may be connected with a chimney, as it is not desirable to preserve any of the vapors. It is intended to insure a free circulation of air through the tubes, and hence it is advantageous to connect the pipe $a^{11}$ with a chimney.

In the lower part of the chamber B a furnace, D, is located. The products of combustion emanating from the fire in this furnace pass upwardly through the chamber B, and in their passage heat the tubes $A'$ $A^2$ $A^3$ and the contents thereof. In the chamber B are three deflecting-plates, $E'$ $E^2$ $E^3$, which may be made of cast-iron or any other suitable material. Owing to the presence of these deflecting-plates, the products of combustion escaping from the furnace pass, in the example of my apparatus here illustrated, to the left under the deflecting-plate $E'$, thence upwardly to the lower portion of the tube $A^3$, which is within the chamber and around this portion of the tube. Thence they pass to the right between the deflecting-plate $E'$ and the deflecting-plate $E^2$, and traverse the length of that portion of the tube $A^3$ which is within the chamber B. Thence they pass upwardly between the end of the deflecting-plate $E^2$ and the wall $b^2$. Afterward they pass to the left between the deflecting-plate $E^2$ and the deflecting-plate $E^3$ and around the tube $A^2$. Thence they pass upwardly between the end of the deflecting-plate $E^2$ and the wall $b'$ and circulate around the portion of the tube $A'$ which is within the chamber B. They escape through a pipe, F, which may communicate with a chimney, if desired.

The acetate is intended to be fed very slowly through the tube $A'$, subsequently through the tube $A^2$, and afterward through the tube $A^3$. The rapidity of its movement through the tubes is to be such that it will be sufficiently heated or roasted before its escape from the tube $A^3$ to insure the desired purification.

The acetate will not merely be fed along by the blades, but will be stirred and changed in position throughout the tubes, so that all parts may be equally exposed to the influences of the heat.

It will be observed that the passage of the acetate is downward, whereas the passage of the products of combustion is upward, or in the reverse direction to that of the acetate. Owing to this the acetate is very gradually heated. The products of combustion will have cooled somewhat before coming in contact with the tube $A'$, and inasmuch as they will have cooled less when contacting with the tube $A^2$ than with the tube $A'$, and still less when passing around the tube $A^3$, the acetate will be subjected to a greater heat in the tube $A^2$ than in the tube $A'$, and to a still greater heat in the tube $A^3$.

It will be seen that the process is a continuous one. It may also be said to be a progressive process, inasmuch as the graduated heat will drive off different impurities, not excepting moisture, according to the degrees of heat necessary.

By my process I avoid the liability of dangerous heating of the acetate, and withal secure a proper degree of heat for driving off impurities without any serious decomposition of the acetate itself.

I am enabled to accomplish my object largely owing to the fact that the acetate while being gradually heated is stirred, so that every portion will be properly subjected to the heat which is available.

The purified acetate discharged from the tube $A^3$ may be collected in any suitable vessels. It will be placed in a retort and distilled with a temperature at or above three hundred degrees centigrade, (300° centigrade.) Acetone of great purity will be collected in the receiver. This acetone may be further purified, as desired.

I have not deemed it necessary to illustrate or give any detailed description of the apparatus which may be employed in the distillation of the acetate and purification of the acetone.

What I claim as my invention, and desire to secure by Letters Patent, is—

1. The process of making acetone, consisting in purifying an acetate by passing the same continuously through a system of tubes heated from the exterior, and subsequently destructively distilling the acetate purified by this treatment, substantially as specified.

2. The process of making acetone, consisting in purifying an acetate by passing the same continuously through a system of tubes, stirring it up within the tubes during its passage through them, and heating it while within the tubes by heat outside the tubes, and subsequently destructively distilling the purified acetate, substantially as specified.

3. The process of making acetone, consisting in purifying an acetate by passing the same continuously through a system of tubes and circulating a heating agent around the tubes in the reverse direction, and in subsequently destructively distilling the purified acetate, substantially as specified.

In testimony whereof I have signed my name to this specification in the presence of two subscribing witnesses.

GUSTAV RUMPF.

Witnesses:
  THEODOR FILKA,
  OTTO LATTMANN.